United States Patent
San-Miguel et al.

(10) Patent No.: US 12,037,295 B2
(45) Date of Patent: Jul. 16, 2024

(54) CERAMIC FOAM

(71) Applicant: SAINT-GOBAIN CENTRE DE RECHERCHES ET D'ETUDES EUROPEEN, Courbevoie (FR)

(72) Inventors: Laurie San-Miguel, Althen des Paluds (FR); Yannick Millot, Le Thor (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 16/648,157

(22) PCT Filed: Sep. 18, 2018

(86) PCT No.: PCT/EP2018/075244
§ 371 (c)(1),
(2) Date: Mar. 17, 2020

(87) PCT Pub. No.: WO2019/057729
PCT Pub. Date: Mar. 28, 2019

(65) Prior Publication Data
US 2020/0216366 A1 Jul. 9, 2020

(30) Foreign Application Priority Data
Sep. 19, 2017 (FR) ..................... 1758675

(51) Int. Cl.
C04B 38/10 (2006.01)
C04B 35/10 (2006.01)
F27D 1/00 (2006.01)

(52) U.S. Cl.
CPC ............. *C04B 38/10* (2013.01); *C04B 35/10* (2013.01); *F27D 1/0003* (2013.01);
(Continued)

(58) Field of Classification Search
CPC .............................. F27D 1/0006; C04B 38/10
See application file for complete search history.

(56) References Cited

U.S. PATENT DOCUMENTS 3,754,950 A * 8/1973 Cevales ................ C04B 35/107
501/105
4,472,332 A * 9/1984 Fukushima ........ B01D 39/2093
264/44
(Continued)

FOREIGN PATENT DOCUMENTS

CN 104557061 A * 4/2015
CN 105837241 A 8/2016
(Continued)

OTHER PUBLICATIONS

CN-104557061-A English language translation, generated with SEARCH program on May 4, 2022.*
(Continued)

*Primary Examiner* — Mark Ruthkosky
*Assistant Examiner* — Julia L Rummel
(74) *Attorney, Agent, or Firm* — Ronald M. Kachmarik; Cooper Legal Group LLC (57) ABSTRACT

A sintered ceramic foam that has a total porosity of greater than 60% by volume and the following phase composition, in mass percent based on the crystallized phases: 25 to 55% mullite, 20 to 65% corundum, 10 to 40% zirconia, mullite, corundum and zirconia together representing more than 80% of the mass of the crystallized phases. Also, a furnace that has a thermal insulator such ceramic foam.

20 Claims, 1 Drawing Sheet

(52) U.S. Cl.
CPC ............... *C04B 2235/3217* (2013.01); *C04B 2235/3244* (2013.01); *C04B 2235/3463* (2013.01); *C04B 2235/9607* (2013.01); *F27D 1/0006* (2013.01)

(56) References Cited

U.S. PATENT DOCUMENTS

| | | | | |
|---|---|---|---|---|
| 4,963,515 | A * | 10/1990 | Helferich | C04B 35/19 |
| | | | | 501/84 |
| 2009/0069167 | A1* | 3/2009 | Tardivat | C04B 38/02 |
| | | | | 501/84 |
| 2009/0221415 | A1* | 9/2009 | Avedikian | C04B 35/106 |
| | | | | 501/105 |
| 2010/0298109 | A1* | 11/2010 | Takenami | C04B 35/185 |
| | | | | 501/4 |
| 2012/0025434 | A1* | 2/2012 | Demey | C04B 35/565 |
| | | | | 427/244 |
| 2014/0128242 | A1* | 5/2014 | Taniyama | C04B 38/10 |
| | | | | 501/128 |
| 2017/0283331 | A1* | 10/2017 | Rath | C04B 35/632 |

FOREIGN PATENT DOCUMENTS

| | | | | |
|---|---|---|---|---|
| EP | 1329439 | A1 * | 7/2003 | ............ B22F 1/0051 |
| GB | 2469608 | A | 10/2010 | |
| UA | 46113 | C2 * | 5/2002 | |
| WO | 2013/011436 | A1 | 1/2013 | |
| WO | 2014/020522 | A1 | 2/2014 | |
| WO | WO-2016045996 | A1 * | 3/2016 | ............ B28B 11/243 |

OTHER PUBLICATIONS

Translation of UA 46113 C2, generated on May 15, 2023 with Google Translate (https://translate.google.com/).*
Accuratus, "Mullite Ceramic Properties" 2013, p. 1-2; Accessed at http://accuratus.com/mullite.html.*
International Search Report corresponding International application PCT/EP2018/075244 dated Oct. 16, 2018, 7 pages.

* cited by examiner

CERAMIC FOAM

TECHNICAL FIELD

The invention relates to a refractory ceramic foam, to a process for manufacturing same and to the use of such a ceramic foam, in particular as a thermal insulator in an environment with a temperature of up to 1200° C.

PRIOR ART

A ceramic foam is a sintered honeycomb structure, each honeycomb, or "cell", being delimited by a wall comprising, preferably made of, a ceramic material. Ceramic foams conventionally have a total porosity typically between 65 and 95% by volume.

There are several manufacturing processes for ceramic foams.

The simplest of these processes involves the addition of a pore-forming agent to a ceramic slurry or press mix. The slurry or mixture is shaped into a preform. The preform undergoes a firing cycle that allows the pore-forming agent to be burned. As it burns, the pore-forming agent gives way to a pore. Such a process is for example described in patent EP1140731 B1.

Another process involves the replication of a polymer, for example polyurethane, foam. More precisely, the polymer foam is covered with a suspension containing ceramic particles and then undergoes a firing cycle that burns the polyurethane foam and sinters the particles. The resulting ceramic foam thus has a structure induced by the starting polymer foam. Such a process is for example described in U.S. Pat. No. 4,024,212 or WO00/69542.

A ceramic foam can also be made from a droplet-forming oil or paraffin emulsion. Ceramic particles are deposited on the droplets. The whole is then dried, loosened and sintered. Such a process is for example described in the article "Production of porous materials through consolidation of Pickering emulsions" by Bram Neirinck et al., in *Advanced engineering materials* 2007, 9, No 1-2.

Another process comprises the creation of pores by means of a gas obtained by chemical reaction between different additives added to a slurry of ceramic particles. Such a process is for example described in U.S. Pat. No. 5,643,512 or 5,705,448.

Another process, known as "direct foaming", consists of introducing a gas into a slurry, either by stirring or by gas injection.

A ceramic foam can also be obtained by stirring a ceramic slurry containing a gelling agent. Such a process is for example described in EP 1 329 439 A1.

This process consists of the following steps:
1) Preparing a suspension of a ceramic powder using a dispersant,
2) Preparing a solution containing a biogel, also called "hydrocolloid", and maintaining at a temperature above the gelation temperature of the solution,
3) Mixing said suspension and said solution, with the addition of a foaming agent, until an intermediate foam is obtained, the temperature being maintained sufficiently high to avoid gelation of the biogel,
4) Casting the intermediate foam into a mold,
5) Cooling until the biogel gels,
6) Drying, calcining and sintering to obtain a ceramic foam.

The use of a biogel to consolidate the intermediate foam advantageously avoids the toxicity problems observed with certain manufacturing processes, in particular by replication.

Also known from WO 2006 018537 is a manufacturing process for making a ceramic foam of homogeneous density and having dimensions greater than or equal to 60 mm, said process comprising the following successive steps:
a) Preparing a mixture M containing a ceramic powder in suspension, at least one gelling agent, a stabilizing agent and at least one foaming agent, at a mixing temperature higher than the gelation temperature of said gelling agent,
b) Shearing said mixture M at a foaming temperature above said gelation temperature until an intermediate foam is obtained,
c) Gelling said intermediate foam by cooling said mixture M to a temperature below the gelation temperature of said gelling agent,
d) Drying the gelled intermediate foam to obtain a preform,
e) Sintering the preform so as to obtain a ceramic foam.

EP 1 945 593 A1 describes a process similar to a direct foaming process, comprising stirring a mixture comprising 25 to 35% by mass of water, 40 to 60% by mass of a refractory fine-grained powder, 7 to 24% by mass of an organic pore-forming agent, 1.5 to 4% by mass of a foaming agent, 0.1 to 0.4% by mass of a stabilizing agent and a hydroxide of a refractory metal such as Al, Mg or Zr, typically in an amount of 2 to 10% by mass. Example 3 describes in particular a ceramic foam comprising 57% by mass of alumina (corundum) and 43% of mullite ($3Al_2O_3$-$2SiO_2$). The transformation of hydroxide precursors during firing, typically between 300 and 700° C., can however cause structural defects on ceramic foams with a thickness greater than 50 mm.

US 2009 197756 and U.S. Pat. No. 8,044,105 B2 proposed to stabilize an intermediate foam obtained by mechanical stirring and gelling by adding to the initial aqueous suspension an albumin-like protein associated with an aldehyde. Example 1 uses a suspension containing precursors and sintering agents to obtain, after firing, a mullite ceramic foam.

Finally, CN105837241 describes a ceramic foam intended for the filtration of molten metal and consisting of a material comprising mullite (20-45% by mass), corundum (0.5-10% by mass), zirconia (30-75% by mass), and a glassy phase (0.1-5% by mass). A preferred starting mix formulation is by mass, 20 to 60%, more preferably 25 to 45% of a zirconia ($ZrO_2$) powder; 20 to 45%, more preferably 25 to 40% of an alumina ($Al_2O_3$) powder; and 20 to 45%, more preferably 30 to 40% of a zircon powder (zirconium silicate $ZrSiO_4$).

In particular for application as a furnace thermal insulator, there is a permanent need for a ceramic foam with a high modulus of rupture between 20° C. and 1400° C., a total porosity of more than 60%, a very good thermal cycling resistance and a thermal conductivity at 1200° C. of less than 0.8 W/(m·K).

There is also a need for a manufacturing process for such a ceramic foam that is simple to implement and allows the manufacture of homogeneous ceramic foams of various shapes and/or with a thickness greater than 50 mm.

The purpose of the invention is to meet these needs.

SUMMARY OF THE INVENTION

The invention provides a sintered ceramic foam having the following phase composition, in percent by mass based on the crystallized phases:

25 to 55% mullite ($3Al_2O_3 \cdot 2SiO_2$),
20 to 65% corundum ($Al_2O_3$ in alpha crystalline form),
10 to 40% zirconia ($ZrO_2$), mullite, corundum and zirconia together representing more than 80%, preferably more than 90%, preferably more than 95%, preferably more than 98% of the mass of the crystallized phases.

Without being able to explain it theoretically, the inventors observed that such a phase composition makes it possible to obtain a modulus of rupture greater than or equal to 2 MPa between 20° C. and 1400° C., without increasing the thermal conductivity of the material constituting the ceramic foam, nor degrading the resistance to thermal cycling or to thermal shocks, or even improving the latter property.

The invention also relates to a process for manufacturing a ceramic foam according to the invention, said process comprising the following steps:

A. Preparing a first mixture comprising, preferably consisting of, a mixture of:
refractory oxide particles selected so as to obtain, at the end of step F., a ceramic foam according to the invention, the refractory oxide particles representing more than 50%, preferably more than 60%, preferably more than 70%, preferably more than 80% by mass of the first mixture;
a liquid containing a wetting agent and/or a dispersant;

B. Independently of step A., preparing a second mixture, comprising, preferably consisting of
a gelling agent, preferably gelatin or a gelatin derivative,
a foaming agent, and
preferably a plasticizer, preferably glycerin or a glycerin derivative;

C. Incorporating the first and second mixtures in a thermostatically controlled reactor and foaming by mechanical stirring, preferably for more than 10 minutes, preferably for 25 to 30 minutes, so as to obtain a foamed mixture;

D. Pouring the foam mixture into a mold at a temperature below 40° C., preferably at a temperature below 30° C.;

E. Drying the preform, preferably for a period of less than 150 hours, and preferably at a temperature below 28° C., in order to obtain a preform having a residual water content of less than 1.5%, preferably less than 1%;

F. Sintering in an oxidizing atmosphere, preferably in air, preferably at a temperature above 1600° C. and preferably below 1750° C., for a period of preferably more than 2 hours, preferably at least 4 hours, preferably more than 6 hours.

Finally, the invention relates to a furnace, in particular
a furnace for firing refractory parts or ceramic parts, in particular made of porcelain, and
a furnace for the heat treatment of inorganic materials, in particular metals, glass or ceramics, at a temperature of 1200° C. or higher, for example a firing, sintering or annealing furnace, the lining of which comprises a heat insulator consisting of a ceramic foam according to the invention or manufactured according to a process according to the invention. Advantageously, such a lining has a good resistance to thermal shock.

The invention relates in particular to an element of such a furnace chosen from a wall, a vault, a support for receiving and protecting heating elements of the furnace, a floor of a wagon, in particular of a wagon for an intermittent furnace, for example a "cell" furnace, or a continuous furnace, for example a "tunnel" furnace, more particularly a floor of a wagon comprising a firing support, in particular for supporting ceramic pieces.

BRIEF DESCRIPTION OF THE FIGURES

Further features and advantages of the present invention will appear upon reading the following description and examining the appended drawing in which.

In the various figures, identical reference signs are used to designate identical or similar objects.

Definitions

A "preform" is conventionally defined as a set of particles bound by means of a binder, usually temporary, and whose microstructure will change during sintering. A preform may in particular have the shape of a block (in particular the shape of a parallelepipedal block, a plate, a tile, a tube, of concave or convex shape) or a layer (on a substrate). The preform can also be a support on which a layer of another material is deposited.

"Sintering" is the consolidation by heat treatment at over 1100° C. of a preform, optionally with partial or total melting of some of its constituents (but not all of its constituents, so that the preform is not transformed into a liquid mass).

The "grains" of a sintered product consist of the particles of the preform agglomerated by sintering.

The particle size of a powder is conventionally evaluated by a particle size distribution characterization performed with a laser particle size analyzer, for example, a Partica LA-950 V2 from the company HORIBA. The "median size" of a powder, generally denoted as $D_{50}$, is the size dividing the particles of that powder into first and second populations equal in mass, these first and second populations comprising only particles having a size greater than or equal to, or less than, respectively, the median size. The median size can for example be measured with a laser particle size analyzer.

The "mean size" of the grains of a sintered product is the dimension measured according to a "mean linear intercept" method. A measurement method of this type is described in ASTM E1382.

The maximum size of a pore is called its "pore size". In the ceramic foams of the invention, the macropores have a quasi-spherical shape and the size is in this case the equivalent diameter, i.e. the diameter of a disk of the same area. The pore size is measured by image analysis of the surface of ceramic foams.

"Ceramic material" means a material that is neither organic nor metallic.

"Refractory oxide" means an oxide with a melting temperature above 1500° C. This definition is commonly used by the skilled person and is cited in "*Matériaux réfractaires et céramiques* techniques (*éléments de céramurgie et de technologie*)", G. Aliprandi, editions Septima Paris, 1979.

For the sake of clarity, the chemical formulae of the oxides are used to refer exclusively to the contents of these oxides in a composition. For example, "$ZrO_2$", "$HfO_2$", "$SiO_2$" or "$Al_2O_3$" refer to the contents of these oxides in the composition and "zirconia", "hafnia", "silica" and "alumina" are exclusively used to refer to crystallized phases of these oxides consisting of $ZrO_2$, $HfO_2$, $SiO_2$ and $Al_2O_3$, respectively. These oxides may however also be present in other phases, in particular, for example, $SiO_2$ and $Al_2O_3$ may be present as mullite.

"Free silica" means silica not combined with another oxide in the form of a crystalline compound such as, for example, mullite.

Unless otherwise stated, all percentages relating to the phase composition of a ceramic foam are mass percentages based on all crystallized phases.

$HfO_2$ is not chemically dissociable from $ZrO_2$. In the chemical composition of a product containing zirconium oxide, "$ZrO_2$" or "$ZrO_2+HfO_2$" therefore refers to the total content of these two oxides. According to the present invention, $HfO_2$ is not added intentionally in the feedstock. $HfO_2$ therefore refers only to traces of hafnium oxide, this oxide being always naturally present in zirconium oxide sources at levels generally below 2%. For the sake of clarity, the content of zirconium oxide and traces of hafnium oxide can therefore be referred to interchangeably as $ZrO_2+HfO_2$ or as $ZrO_2$.

"At least partially stabilized zirconia" means partially stabilized zirconia or stabilized zirconia. A partially stabilized zirconia is a zirconia comprising monoclinic zirconia, and having less than 50% of its mass under said monoclinic crystallographic phase.

"Mullite-zirconia particle" means a refractory particle obtained by sintering or melting and whose chemical analysis reveals the majority presence (more than 50% by mass) of alumina ($Al_2O_3$), silica ($SiO_2$) and zirconia ($ZrO_2$), the silica and alumina being present essentially in the form $2SiO_2$-$3Al_2O_3$ (mullite) in order to guarantee good refractoriness, good resistance to thermal shock and chemical inertia. Preferably, a mullite-zirconia particle comprises more than 90%, preferably more than 95% by mass of alumina+silica+zirconia.

"Mullite particle" means a refractory particle obtained by sintering or melting and whose chemical analysis reveals the majority presence of alumina ($Al_2O_3$) and silica ($SiO_2$), the silica and alumina being present predominantly in the crystalline form of mullite. Preferably, a mullite particle comprises more than 90% mullite, preferably more than 95% by mass of mullite. A mullite particle has less than 1% zirconia, by mass percentage.

"Alumina-zirconia particles" means particles obtained by electrofusion and which may contain inclusions, in particular titanium oxide inclusions.

"Alumina-zirconia-silica grain" means a grain obtained by electrofusion and composed mainly, i.e. for more than 50% of its mass, of the 3 oxides $Al_2O_3$, $SiO_2$ and $ZrO_2$.

Unless otherwise stated, all percentages relating to the composition of a product or relating to a feedstock are mass percentages on an oxide basis, as is typical in refractory products. In a chemical composition, oxide contents refer to the overall contents for each of the corresponding chemical elements, expressed as the most stable oxide, according to the usual industry convention.

"Dry matter" is conventionally defined as inorganic, mineral and/or metallic, and not hydrated.

The different characteristics of a product according to the invention can be determined by the characterization methods used for the examples below.

Unless otherwise stated, all means are arithmetic means.

The "+" sign separating two oxides indicates a sum of the contents of these oxides. The two constituents linked by this sign are therefore not necessarily present simultaneously.

Unless otherwise specified, particles "of" a constituent, or "of a" constituent, for example, "alumina" or "alumina" particles, are conventionally those particles containing more than 95% of that constituent, by mass percentage.

The verbs "include", "have" or "comprise" should be interpreted broadly, not restrictively, unless otherwise specified.

DETAILED DESCRIPTION

Phase Composition

The mullite content is preferably greater than 35%, preferably greater than 40%, or even greater than 45%, and/or less than 55%, preferably less than 50%.

The corundum content is preferably greater than 25%, preferably greater than 30%, and/or less than 60%, preferably less than 55%, preferably less than 50%, preferably less than 40%.

The zirconia content is preferably greater than 15%, preferably greater than 20%, and/or less than 35%, preferably less than 30%.

Ceramic foam preferably comprises:
- 40 to 60%, preferably 40 to 55% mullite,
- 30 to 40% corundum,
- 15 to 30% zirconia.

Preferably still, more than 40%, preferably more than 60%, preferably more than 80%, preferably more than 90%, preferably substantially 100% of the zirconia, in percent by mass, is in monoclinic crystalline form.

Zirconia which is not in monoclinic crystalline form is preferably stabilized with yttrium, and/or cerium, and/or calcium and/or magnesium.

The glassy or "amorphous" phase preferably represents less than 5% by mass of the ceramic foam; preferably the foam does not contain a glassy phase detectable by X-ray diffraction analysis.

The composition of the phases was obtained by X-ray diffraction. The diffractograms of the crystallized phases can be collected with a D5000 type diffractometer and the data were analyzed qualitatively with the EVA software and the ICDD2016 database.

Chemical Composition

Preferably, the ceramic foam has the following chemical composition, in mass percentages based on the oxides:
- $Al_2O_3$: 50 to 80%;
- $SiO_2$: 5 to 25%;
- $ZrO_2$: 10 to 40%;
- $Fe_2O_3+MnO+B_2O_3+Na_2O+K_2O$: less than 2%, preferably less than 1%;
- Sum of the oxides of calcium, magnesium, yttrium and cerium: less than 10%, preferably less than 5%, preferably less than 3%;
- Other refractory oxides: supplement to 100%.

A sum of oxides, for example "$Fe_2O_3+MnO+B_2O_3+Na_2O+K_2O$", refers to the total content of these oxides, but does not imply that they are all present.

Of course, the phase composition of a ceramic foam according to the invention implies limitations on the composition, and in particular on the total content of $Al_2O_3+SiO_2+ZrO_2$.

The $Al_2O_3$ content is preferably greater than 55%, preferably greater than 60%, and/or less than 70%.

Preferably, the $SiO_2$ content is greater than 7%, preferably greater than 10% and/or less than 20%.

Preferably, the $ZrO_2$ content is greater than 15%, and/or less than 30%, preferably less than 25%.

Preferably, the total $Al_2O_3+SiO_2+ZrO_2$ content is greater than 90%, preferably greater than 95%, preferably greater than 98%, in mass percentages based on the oxides.

The $SiO_2/Al_2O_3$ mass ratio is preferably between 9 and 30, preferably between 10 and 25.

The $ZrO_2/Al_2O_3$ mass ratio is preferably between 15 and 80, preferably between 20 and 50, more preferably between 25 and 40.

Preferably, the content of $TiO_2$, which belongs to the "other oxides", is less than 1% or even less than 0.5%.

The "other oxides" are oxides other than $Al_2O_3$, $SiO_2$, $ZrO_2$, $Fe_2O_3$, MnO, $B_2O_3$, $Na_2O$, $K_2O$, CaO, MgO, $Y_2O_3$ and $Ce_2O_3$.

Preferably, the ceramic foam contains less than 1% chromium oxide $Cr_2O_3$, which is part of the "other oxides". Preferably it does not contain chromium oxide.

The "other oxides" are preferably less than 20%, preferably less than 15%, preferably less than 8%, or even less than 5%, less than 3.0%, less than 2.0%, less than 1.0%, less than 0.5%. In one embodiment, the "other oxides" are impurities.

Oxides represent more than 90%, preferably more than 95%, preferably more than 99%, preferably substantially 100% of the mass of the ceramic foam.

The mass content of the above-mentioned oxides is typically determined by X-ray fluorescence and/or inductively coupled plasma (ICP).

The organic matter content, measured conventionally by "loss on ignition" at 750° C. for 30 minutes in air, is preferably less than 0.5%, or even less than 0.1%, in mass percentage based on the foam.

Microstructure

The ceramic foam has a plurality of cells 10 (see FIG. 1), the majority of these cells being connected to other adjacent cells by windows 12. A cell on the surface of the porous ceramic foam also usually has one or more openings to the outside.

Figure 1:
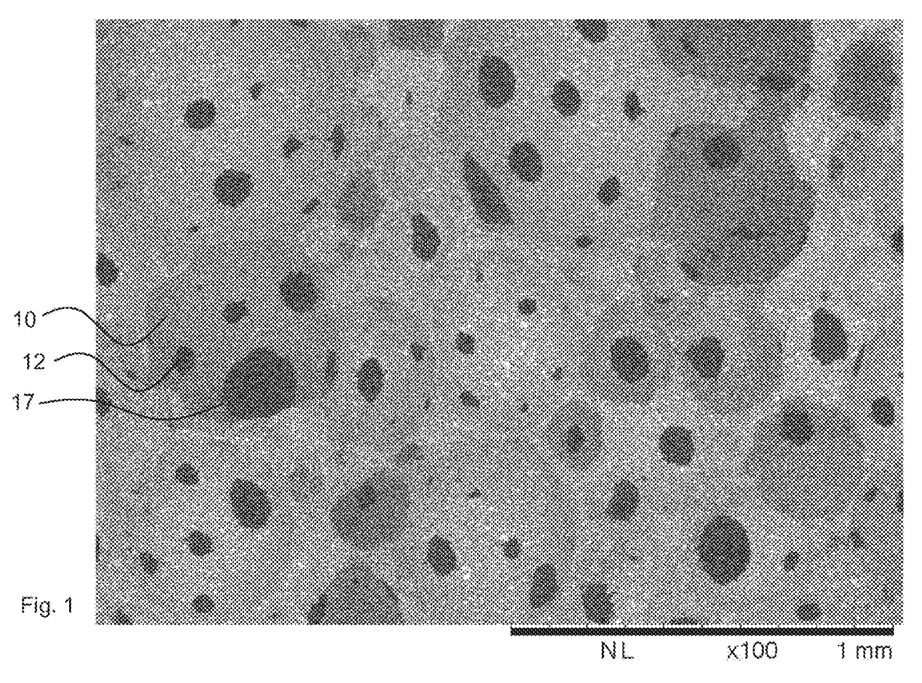
FIGS. 1 and 2 show, at different magnifications, images obtained with a scanning electron microscope (SEM) on samples of a ceramic foam according to the invention.

The walls 17 delimiting the cells 10, made up of particles agglomerated by sintering, have an "intergranular" porosity. They are in fact formed by agglomeration of particles 18, this agglomeration leaving interstices 19 or "intergranular pores", between the particles 18.

The intergranular porosity can be modified according to the particle size of the ceramic powder used. The mean size of the intergranular pores is preferably less than 10 μm The intergranular porosity, preferably greater than 1%, and/or less than 10%.

The volumes delimited by the walls 17 define a "macroporous" porosity. The size of the cell pores, or "macropores", generally ranges from 10 to 2000 μm. The mean size of the cell pores is preferably 10 to 100 times larger than that of the intergranular pores, preferably between 80 and 1000, preferably between 100 and 1000 micrometers, preferably between 150 and 700 μm, preferably between 200 and 500 μm, preferably about 400 μm.

Intergranular porosity thus coexists with macroporosity, the total porosity being the sum of macroporosity, or "macroporous porosity", and intergranular porosity. Macroporosity is thus formed by volumes whose limits are not the necessary consequence of grain agglomeration, but result from a particular arrangement of these grains and the foaming process.

Macroporosity includes closed volumes or "pores", i.e. defined by cells not connected with other cells, and open volumes or "pores", i.e. interconnected with other pores. A ceramic foam according to the invention has a total porosity equal to the sum of intergranular porosity, open macroporosity and very high closed macroporosity. Total porosity is typically between 65 and 95% by volume.

Preferably, the total porosity is greater than 60%, greater than 70%, greater than 75%, greater than 78% and/or less than 90%, preferably less than 85%, by volume.

The ceramic foam has a total macroporosity (sum of open and closed macroporosities) of greater than 70%, preferably greater than 75% or even greater than 80%, and/or less than 95% or even less than 90%, in volume percent.

Open porosity preferably represents more than 60%, preferably more than 70%, preferably more than 80%, preferably more than 90%, preferably more than 95% of the macroporosity.

The mean wall thickness is typically between 30 and 300 micrometers, preferably between 45 and 200 micrometers, preferably between 45 and 100 micrometers.

The interconnection windows 12 preferably have, on average, an equivalent diameter greater than $\frac{1}{100}$ and/or less than $\frac{1}{3}$ of the mean equivalent diameter of the cells 10.

The mean grain size is preferably greater than or equal to 5 micrometers and/or less than 200 micrometers, preferably less than 100 micrometers.

Figure 2:
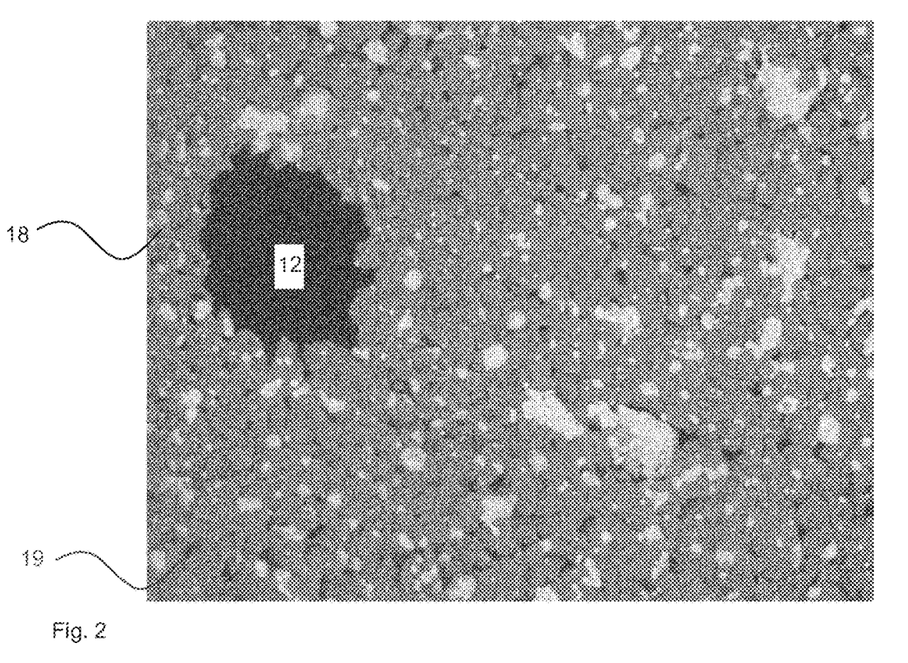

More than 90%, preferably more than 95%, preferably substantially 100% by number, of the grains are preferably alumina grains, in particular tabular alumina, and/or mullite grains (shown in gray in FIG. 2), and/or zirconia grains (shown in white in FIG. 2), and/or mullite-zirconia grains, and/or alumina-zirconia grains, and/or alumina-zirconia-silica grains.

The grains are sintered or fused grains, including electrofused grains, for example alumina-zirconia or alumina-zirconia-silica.

Preferably the grains contain less than 5%, preferably less than 2%, preferably less than 1%, preferably substantially no "free" silica.

According to an embodiment, zirconia can be present as zirconia grains or as sintered or electrofused mullite-zirconia grains.

These microstructures can be observed using a scanning electron microscope (SEM).

Process of Manufacture

A ceramic foam according to the invention can be produced in particular according to steps a) to e) above, in particular according to a process described in EP 1 329 439.

Preferably, the ceramic foam is produced by a process comprising the above steps A. to F.

This process is conventional, except for steps A. and B. Advantageously, this difference makes it possible to obtain a great homogeneity, even in the presence of gelling agent.

In step A., the first mixture is preferably prepared at a temperature between 40 and 70° C., preferably between 50 and 60° C., preferably under continuous mechanical stirring, preferably for more than 30 minutes, preferably more than 60 minutes and, preferably less than 90 minutes.

The mass quantity of dispersant is preferably between 0.1 and 5% in relation to the dry matter of the first mixture.

In one embodiment, the first mixture does not contain wetting agent.

The wetting and dispersing agents can be conventional.

The quantity of water in the first mixture, preferably deionized, is between 10 and 25%, more preferably between 12 and 20%, or even between 13 and 18% in relation to the dry matter.

In step B., the second mixture is preferably prepared at a temperature between 40 and 70° C., preferably between 50 and 65° C., under continuous mechanical stirring, for 10 minutes, or even 20 minutes, and preferably less than 30 minutes and less than 1 hour.

The quantity of water in the second mixture, preferably deionized, is preferably between 5 and 15% in relation to the dry matter.

In step C., mechanical stirring is preferably continued until an "expansion ratio" or rate of expansion greater than 2, greater than 4, or even greater than 5, is obtained.

In step D., the sides of the mold in contact with the foam mixture are preferably made of Bakelite or Teflon. Preferably, the preform is demolded before drying.

Preferably, the mold can be dismantled. A release agent can be used to facilitate the release operation.

Alternatively, it is possible to introduce air, or more generally a gas, into the second mixture before step C. Thus, the second mixture of gelatin and foaming agent is brought in already "foamed" before being mixed with the first mixture containing mineral particles. Such an alternative is described in the publication "*Foam sprayed porous insulating refractories*" by V. R. Salvini, A. P. Luz and V. C. Pandolfelli Refractories Worldforum 4 (2012) [4].

Alternatively, it is possible to use a foam mixer, preferably of the rotor-stator type, in which the first and second mixtures are added successively or simultaneously, air, or more generally a gas, preferably being introduced into the feedstock (first mixture+second mixture) of the foam mixer.

Examples

The following non-limiting examples are given for the purpose of illustrating the invention.

Manufacturing

In the examples, the raw materials used were selected from:
- corundum $Al_2O_3$ powder of greater than 99.5% purity, with particles less than 0.2 mm in size;
- corundum $Al_2O_3$ powder of greater than 99.5% purity, with particles less than 50 micrometers in size;
- a mixture of calcined and reactive aluminas, containing more than 99% $Al_2O_3$ and having a median size of between 0.1 and 7 micrometers;
- a powder of mullite particles, the powder having a median size of between 7 and 15 micrometers and having the following composition:
  $Al_2O_3$: 72%
  $SiO_2$: 26%
- a powder of mullite-zirconia particles, the powder having a median size of between 7 and 15 micrometers and having the following composition:
  $Al_2O_3$: 45%
  $SiO_2$: 19%
  $ZrO_2$: 35%
- a zirconia powder CC10, containing more than 99% $ZrO_2$, with a median size $D_{50}$ of 3 to 5 micrometers, supplied by the company SEPR;
- zircon sand, with a purity of $ZrO_2+SiO_2$ greater than 98%, and a median size $D_{50}$ of 4 to 6 micrometers;
- quartz sand, with a purity higher than 98% and a median size $D_{50}$ of about 3 micrometers;
- silica fume ERQ4, median size $D_{50}$ of 0.5 micrometers, supplied by SEPR;
- 280 bloom—20 mesh quality gelatin;
- glycerin of a purity greater than or equal to 99.7%;
- a foaming agent based on fatty alcohol sulfonate;
- a dispersant based on ammonium polyacrylate;
- an yttrium oxide powder of greater than 99% purity, having a median size of about 1.6 micrometers.

The following table, Table 1, summarizes the mineral raw material compositions of the feedstocks.

TABLE 1

| | Comparative examples | | | | | | | | | | | According to the invention | | | | |
|---|---|---|---|---|---|---|---|---|---|---|---|---|---|---|---|---|
| | C1 | C2 | C3 | C4 | C5 | C6 | C7 | C8 | C9 | C10 | C11 | 1 | 2 | 3 | 4 | 5 |
| Corundum powder 0-0.2 mm | 39.1 | 39.1 | 39.1 | 39.1 | 0 | 39.1 | 39.1 | 5 | 24 | 14 | 5 | 0 | 0 | 0 | 0 | 0 |
| Corundum powder 0-50 micrometers | 8 | 8 | 8 | 8 | 8 | 8 | 8 | 7 | 5 | 3 | 2 | 8 | 8 | 8 | 8 | 7 |
| Mullite powder | 0 | 0 | 0 | 0 | 0 | 0 | 0 | 8 | 18 | 2 | 21 | 0 | 0 | 0 | 0 | 0 |
| Mullite-zirconia powder | 0 | 0 | 0 | 0 | 39.1 | 0 | 0 | 27.1 | 0 | 28 | 19 | 39.1 | 39.1 | 39.1 | 39.1 | 39.1 |
| Mixture of calcined and reactive aluminas | 52.9 | 46.9 | 39.9 | 39.9 | 17.9 | 42.4 | 37.9 | 17.9 | 32 | 17.9 | 24 | 52.9 | 39.9 | 39.9 | 39.9 | 39.9 |
| Zircon sand | 0 | 0 | 0 | 11 | 0 | 10.5 | 15 | 0 | 0 | 5 | 0 | 0 | 11 | 0 | 11 | 11 |
| Zirconia CC10 | 0 | 0 | 7 | 0 | 29 | 0 | 0 | 29 | 21 | 30.1 | 23 | 0 | 0 | 7 | 0 | 0 |
| Quartz sand | 0 | 0 | 4 | 1 | 4 | 0 | 0 | 4 | 0 | 0 | 4 | 0 | 1 | 4 | 1 | 1 |
| Silica fume ERQ4 | 0 | 6 | 2 | 1 | 2 | 0 | 0 | 2 | 0 | 0 | 2.0 | 0 | 1 | 2 | 1 | 1 |
| Yttrium oxide | 0 | 0 | 0 | 0 | 0 | 0 | 0 | 0 | 0 | 0 | 0 | 0 | 0 | 0 | 0 | 1 |
| Total | 100 | 100 | 100 | 100 | 100 | 100 | 100 | 100 | 100 | 100 | 100 | 100 | 100 | 100 | 100 | 100 |

The ceramic foams were manufactured as follows: First and second mixtures were prepared, each in a bath thermostatically controlled at a temperature below 65° C., by adding:
- for the first mixture, the dispersant (+1 to +1.5% in relation to the dry mass), mineral powders and deionized water (between +14% and 16.2% in relation to the dry mass);
- for the second mixture, 10 to 12% deionized water, poured into a thermostatically controlled tank, then 3% gelatin (gelling agent), 2% glycerin (plasticizing agent) and finally 1 to 2% foaming agent were added, in percentages in relation to the dry matter.

Each of the first and second mixtures was kept under constant mechanical stirring, using a disperser equipped with a dispersing disk, for a minimum of 20 minutes until good dispersion was obtained.

The first and second mixtures were then mixed, again in a thermostatically controlled tank, for more than 20 minutes to obtain a foamy mixture.

The foamy mixture was poured into a Bakelite mold at room temperature (below 25° C.) and the contents of the mold were then dried for 150 hours at a temperature below 28° C. to obtain a preform with the following dimensions: 300 mm×300 mm×60 mm.

The preform was then sintered under air for 6 hours at a temperature between 1600° C. and 1750° C., to obtain a sintered ceramic foam.

Table 2 provides the chemical composition of the ceramic foams obtained, in mass percentages based on the oxides.

Table 3 provides the phase composition of the ceramic foams obtained, in mass percentages based on the crystallized phases (which represent substantially 100% of the phases present).

Characterization of Properties

Each ceramic foam was characterized as follows:

Measurements of dynamic modulus of elasticity (MoE) values are determined at room temperature (20° C.) and after thermal shock, according to ASTM C 1259, using an IMCE, RFDA system23 measuring device. Heat shock consists in subjecting a sample initially at room temperature to a heat treatment consisting of a temperature rise to 1200° C., at a speed of 150° C./h, holding at this bearing temperature for 3.5 h, then quenching in air, by natural convection. The reported value is an average obtained on three samples with the following dimensions 180*40*40 mm$^3$.

Measurements of modulus of rupture (MoR) values are performed at room temperature (20° C.), and after thermal shock, according to NF EN 843-1 or ISO 14610, in a 4-point bending configuration. Heat shock consists in subjecting a sample initially at room temperature to a heat treatment consisting of a temperature rise to 1200° C., at a speed of 150° C./h, holding at this bearing temperature for 3.5 h, then quenching in air, by natural convection. The reported value is an average obtained on three samples with the following dimensions 180*40*40 mm$^3$.

Measurements of modulus of rupture (MoR) values at 1400° C. (hot MoR) are carried out according to NF EN 993-7, in a 3-point bending configuration. The reported value is an average obtained on three samples with the following dimensions 150*25*25 mm$^3$.

MoR loss (%) is equal to:

[MoR (sample before heat treatment)−MoR (sample after heat treatment)]*100/[MoR (sample before heat treatment)]

This value is an indication of the resistance to thermal shock.

The ratio (MoR (MPa)*1000)/MoE (GPa) is calculated from the MoR and MoE values measured on non-heat-treated samples. This ratio is an indication of the resistance to the thermal gradient.

The pore volume is calculated from the measurement of geometric density and of absolute density according to the following formula:

Pore volume (%)=[absolute density−geometric density]*100/absolute density

The pore volume corresponds roughly to the macroporosity.

The geometric density is measured according to ISO 5016:1997 or EN 1094-4 and expressed in g/cm$^3$. It is conventionally equal to the ratio of the mass of the sample divided by the apparent volume.

The absolute density value, expressed in g/cm$^3$, is conventionally measured by dividing the mass of a sample by the volume of the sample ground so as to substantially remove porosity. In this case, the grinding is adapted to reduce the sample to a powder with a particle size of less than 40 micrometers. Absolute density can be measured by helium pycnometry using an Accupyc II 1340 instrument from Micromeritics. The standard used by the manufacturer is ASTM C604-02 (2012).

The total porosity, in percentage, is conventionally equal to 100*(1−the ratio of the geometric density divided by the absolute density).

Thermal conductivity is measured according to ISO 8894-2, at 1200° C. The reported value is an average obtained from five measuring points.

The results are reported in Table 4 below.

TABLE 2

| | Comparative examples | | | | | | | | | | | According to the invention | | | | |
|---|---|---|---|---|---|---|---|---|---|---|---|---|---|---|---|---|
| | C1 | C2 | C3 | C4 | C5 | C6 | C7 | C8 | C9 | C10 | C11 | 1 | 2 | 3 | 4 | 5 |
| % $Al_2O_3$ | 99.5 | 93.5 | 86.5 | 86.5 | 43.2 | 89.0 | 84.5 | 47.9 | 73.8 | 48.9 | 54.4 | 78.0 | 65.2 | 65.2 | 65.2 | 64.2 |
| % $SiO_2$ | <0.3 | 6.0 | 6.1 | 5.8 | 13.5 | 3.7 | 5.1 | 13.2 | 4.8 | 7.6 | 15.8 | 7.7 | 13.2 | 13.5 | 13.2 | 13.2 |
| % $ZrO_2$ | 0.0 | 0.0 | 7.0 | 7.3 | 42.6 | 6.9 | 9.9 | 38.2 | 20.8 | 42.8 | 28.9 | 13.7 | 21.0 | 20.7 | 21.0 | 21.0 |
| $Al_2O_3$ (%) + $SiO_2$ (%) + $ZrO_2$ (%) | 99.8 | 99.5 | 99.6 | 99.6 | 99.3 | 99.6 | 99.5 | 99.3 | 99.4 | 99.3 | 99.1 | 99.4 | 99.4 | 99.4 | 99.4 | 98.4 |
| % $Y_2O_3$ | <0.05 | <0.05 | <0.05 | <0.05 | <0.05 | <0.05 | <0.05 | <0.05 | <0.05 | <0.05 | <0.05 | <0.05 | <0.05 | <0.05 | <0.05 | 1.0 |
| Rapport $SiO_2/Al_2O_3$ (*100) | <0.5 | 6.4 | 7.0 | 6.6 | 31.2 | 4.1 | 6.1 | 27.5 | 6.5 | 15.6 | 29 | 9.9 | 20.2 | 20.7 | 20.2 | 20.5 |
| Rapport $ZrO_2/Al_2O_3$ (*100) | 0 | 0 | 8.1 | 8.4 | 98.5 | 7.8 | 11.7 | 79.7 | 28.1 | 87.6 | 53.1 | 17.5 | 32.2 | 31.8 | 32.2 | 32.7 |

TABLE 3

| | Comparative examples | | | | | | | | | | | According to the invention | | | | |
|---|---|---|---|---|---|---|---|---|---|---|---|---|---|---|---|---|
| | C1 | C2 | C3 | C4 | C5 | C6 | C7 | C8 | C9 | C10 | C11 | 1 | 2 | 3 | 4 | 5 |
| % Mullite | 1.0 | 22.3 | 22.3 | 20.9 | 47.0 | 13.2 | 18.4 | 45.9 | 17.9 | 31 | 15 | 25.8 | 45.7 | 47.1 | 45.7 | 45.7 |
| % Corundum | 99.0 | 77.7 | 70.7 | 71.7 | 10.0 | 79.7 | 71.5 | 14.9 | 61.2 | 26 | 55 | 60.3 | 33.0 | 32.0 | 33.0 | 32.0 |
| % Zirconia | 0.0 | <0.1 | 7.0 | 7.4 | 42.7 | 7.1 | 10.1 | 38.2 | 20.9 | 43.0 | 30 | 13.7 | 21.1 | 20.7 | 21.1 | 21.1 |

TABLE 4

|  | Comparative examples | | | | | | | | |
| --- | --- | --- | --- | --- | --- | --- | --- | --- | --- |
|  | C1 | C2 | C3 | C4 | C5 | C6 | C7 | C8 | C9 |
| Geometric density (g/cm³) | 0.70 | 0.70 | 0.69 | 0.67 | 0.81 | 0.43 | 0.42 | 0.83 | 0.75 |
| Absolute density (g/cm³) | 3.97 | 3.77 | 3.90 | 3.88 | 4.03 | 3.97 | 3.94 | 4.08 | 4.06 |
| Total porosity (%) | 82.4 | 81.4 | 82.3 | 82.7 | 79.9 | 89.2 | 89.3 | 79.7 | 81.5 |
| 4-point MoR at 20° C. (MPa) | 3.7 | 2.3 | 3.4 | 3.3 | 2.9 | 0.9 | 0.75 | 2.85 | 2.1 |
| MoR * 1000/MOE | 378 | 348 | 415 | 413 | 432 | 377 | 412 | 425 | 407 |
| MoR loss (%) after thermal shock | 78 | 68 | 79 | 76 | 66 | NM | NM | 67 | 71 |
| 3-point MoR at 1400° C. (MPa) | 0.9 | 1.2 | NM | NM | 2.9 | NM | NM | NM | NM |
| Thermal conductivity at 1200° C. [W/(m * K)] | 0.90 | 0.80 | NM | NM | 0.65 | 0.72 | 0.73 | 0.64 | NM |

|  | Comparative examples | | According to the invention | | | | |
| --- | --- | --- | --- | --- | --- | --- | --- |
|  | C10 | C11 | 1 | 2 | 3 | 4 | 5 |
| Geometric density (g/cm³) | 0.81 | 0.73 | 0.82 | 0.78 | 0.70 | 0.52 | 0.81 |
| Absolute density (g/cm³) | 4.34 | 3.85 | 3.92 | 3.77 | 3.77 | 3.78 | 3.83 |
| Total porosity (%) | 81.3 | 81.0 | 79.1 | 79.3 | 81.4 | 86.2 | 78.9 |
| 4-point MoR at 20° C. (MPa) | 2.6 | 2.6 | 3.8 | 2.7 | 3.3 | 1.2 | 3.7 |
| MoR * 1000/MOE | 371 | 419 | 518 | 474 | 471 | 447 | 496 |
| MoR loss (%) after thermal shock | 73 | 69 | 55 | 59 | 61 | 64 | 62 |
| 3-point MoR at 1400° C. (MPa) | NM | NM | 2.9 | 3.0 | NM | 1.1 | 4.1 |
| Thermal conductivity at 1200° C. [W/(m * K)] | 0.63 | NM | NM | 0.58 | 0.61 | 0.54 | NM |

NM: not measured

The results show an improvement in thermal shock resistance, thermal gradient resistance, mechanical strength at high temperature, with low thermal conductivity at high temperature, regardless of the precursors added to form the mullite and zirconia phases.

Examples 2 and 5 are the preferred examples.

As is now clear, the phase composition of a ceramic foam according to the invention improves the resistance to thermal cycling, and more generally to thermal gradients, the MoR*1000/MoE ratio being able to exceed 440, 470, 500 or even 515.

Furthermore, a ceramic foam also has:
a very high four-point modulus of rupture (MoR) at 20° C., which can be higher than 2.5 MPa or even 3.5 MPa for a pore volume of about 80%;
a very high three-point modulus of rupture (MoR) at 1400° C., which can be higher than 3.0 MPa or even 4.0 MPa for a pore volume of about 80%;
low thermal conductivity at high temperature (at 1200° C.), which can be less than 0.8 W/(m·K), and even less than 0.6 W/(m·K);
improved thermal shock resistance, as the loss of 4-point MoR following heat treatment can be less than 65%, 60%, and even less than 55%.

A ceramic foam according to the invention furthermore has a high total porosity, preferably greater than 79% and even greater than 82%. Preferably, the total porosity is less than 85%. Above 85%, the 4-point modulus of rupture decreases very significantly.

A ceramic foam according to the invention is therefore perfectly suitable for use as a thermal insulator in a furnace.

Finally, advantageously, a ceramic foam according to the invention can be made by direct foaming. This process makes it possible to manufacture, by casting, parts of various shapes and/or with a thickness greater than 50 mm.

Of course, the invention is not however limited to the described embodiments, provided for illustrative purposes only.

The invention claimed is:

1. A furnace having a thermal insulator comprising a sintered ceramic foam having cell pores, a total porosity of greater than 60% and less than 90% by volume and the following phase composition, in mass percent based on the crystallized phases:
>45% and ≤55% mullite,
>25% of corundum,
>20% and <30% zirconia,
mullite, corundum and zirconia together representing more than 80% of the mass of the crystallized phases, the glassy phase representing less than 5% by mass of the ceramic foam,
said sintered ceramic foam containing $ZrO_2$ and $Al_2O_3$ in amounts such that a $ZrO_2/Al_2O_3$ mass ratio is between 0.20 and 0.50,
the ceramic foam resulting from sintering a mixture of mineral powders chosen from powders of alumina, mullite, mullite-zirconia, zirconia, zircon, and silica.

2. The furnace as claimed in claim 1, the $ZrO_2/Al_2O_3$ mass ratio being between 0.25 and 0.40.

3. The furnace as claimed in claim 1, in which said sintered ceramic foam contains $SiO_2$ in an amount such that a $SiO2/Al_2O_3$ mass ratio is at most 0.30.

4. The furnace as claimed in claim 3, in which the $SiO_2/Al_2O_3$ mass ratio is at most 0.25.

5. A process for manufacturing a furnace according to claim 3, said process comprising the following steps:
   A. Preparing a first mixture comprising a mixture of:
      refractory oxide particles selected so as to obtain, at the end of step F., said ceramic foam, the refractory oxide particles representing more than 50% by mass of the first mixture;
      a liquid containing a wetting agent and/or a dispersant;
   B. Independently of step A., preparing a second mixture, comprising
      a gelling agent,
      a foaming agent, and
      preferably a plasticizer
   C. Incorporating the first and second mixtures in a thermostatically controlled reactor and foaming by mechanical stirring so as to obtain a foamed mixture;
   D. Pouring the foam mixture into a mold at a temperature below 40° C.;
   E. Drying the preform in order to obtain a preform having a residual water content of less than 1.5%;
   F. Sintering in an oxidizing atmosphere.

6. The process as claimed in claim 5, wherein:
   at step A, the first mixture consists of a mixture of said refractory oxide particles and said liquid;
   at step B, the second mixture consists of
   gelatin or a gelatin derivative,
   a foaming agent, and
   preferably glycerin or a glycerin derivative
   at step C, the mechanical stirring lasts longer than 10 minutes,
   at step D, the foam mixture is poured at a temperature
   at step F, sintering is performed in air, at a temperature above 1600° C. and below 1750° C., fora period of more than 2 hours.

7. The furnace as claimed in claim 1, the ceramic foam having a total porosity of between 65% and 85%.

8. The furnace as claimed in claim 1, wherein mullite, corundum and zirconia together represent more than 95% of the mass of the crystallized phases.

9. The furnace as claimed in claim 1, wherein the mullite content is less than 50%.

10. The furnace as claimed in claim 1, wherein the corundum content is greater than 30%.

11. The furnace as claimed in claim 1, wherein more than 60% of the zirconia, by mass percent, is in monoclinic crystalline form.

12. The furnace as claimed in claim 1, the ceramic foam having a chemical composition such that, in mass percentages based on the oxides and for a total of 100%:
    Al2O3: <70%;
    SiO2: ≤25%;
    ZrO2: ≤40%;
    Fe2O3+MnO+B2O3+Na2O+K2O: less than 2%;
    CaO+MgO+Y2O3+Ce2O3: less than 10%;
    optional other refractory oxides: supplement to 100%.

13. The furnace as claimed in claim 12, wherein:
    CaO+MgO+Y2O3+Ce2O3: less than 3%.

14. The furnace as claimed in claim 1, the ceramic foam having a macroporosity and an open porosity which represents more than 60% of the macroporosity.

15. The furnace as claimed in claim 1, the ceramic foam having a mean grain size greater than or equal to 5 micrometers and/or less than 200 micrometers.

16. The furnace as claimed in claim 1, the ceramic foam having a mean grain size less than 100 micrometers.

17. The furnace as claimed in claim 1, in which the mean size of the cell pores is between 80 and 1000 µm.

18. The furnace as claimed in claim 1, in which the mean size of the cell pores is between 150 and 700 µm.

19. The furnace as claimed in claim 1, in which the mean size of the cell pores is between 200 and 500 µm.

20. The furnace as claimed in claim 1, the mean wall thickness of walls delimiting the cells pores being between 30 and 300 micrometers.

* * * * *